Aug. 23, 1949.   B. SCHWARZ   2,480,054
CONTROL SYSTEM FOR STATOR FED ALTERNATING
CURRENT COMMUTATOR MOTORS
Filed Feb. 28, 1948   2 Sheets-Sheet 1

Inventor
Berno Schwarz
by [signature]
Atty.

Patented Aug. 23, 1949

2,480,054

UNITED STATES PATENT OFFICE 2,480,054

CONTROL SYSTEM FOR STATOR FED ALTERNATING-CURRENT COMMUTATOR MOTORS

Benno Schwarz, Norwich, England

Application February 28, 1948, Serial No. 11,914
In Great Britain May 26, 1941

Section 1, Public Law 690, August 8, 1946
Patent expires May 26, 1961

6 Claims. (Cl. 318—244)

The invention relates to a control system for stator fed multi-phase commutator motors using an induction regulator for the voltage control in the rotor circuit.

The induction regulator is known as a means for obtaining voltage variation in A. C. supplies in regard to the numerical value and the phase position of the voltage and combinations thereof.

For the purpose of controlling a stator fed A. C. commutator motor it is necessary to introduce in the rotor circuit a variable voltage of essentially fixed phase position which adds algebraically to the rotor voltage of the motor. The introduction of this variable voltage of constant phase position results in the desired speed variation.

Hitherto, in order to obtain a numerically variable voltage with fixed phase position, double induction regulators were used.

In double induction regulators, the two secondary voltages produced, respectively, by the two individual induction regulators, which constitute the double induction regulator, are constant, but their relative phase position varies in such a way that their vectorial sum is variable numerically and has a constant vectorial position.

Besides the voltages, the magnetic fluxes in the two regulators and the internal currents in the windings are constant over the whole control range, irrespective of the magnitude of the resultant secondary voltage, if the supply voltage and the secondary current are constant.

One object of the present invention is to obtain, by means of a single induction regulator, a variable voltage having a constant fixed phase position, to which may be added vectorially a constant voltage of fixed phase position differing from that of the variable voltage.

This voltage will advantageously contain a voltage component which is vectorially at right angles to the rotor voltage in order to obtain power factor correction of the rotor current which is essential for the operation of all but the smallest commutator motors and desirable even for commutator motors of small output.

The introduction of this phase shifting voltage is not primarily conditioned by its influence on the power factor of the input from the supply taken by the motor, but more important, by the necessity for reducing the rotor current to the minimum needed for obtaining the required torque taking into consideration the current carrying capacity of the commutator and brushes and also in order to reduce the speed regulation between no load and full load and to increase the overload capacity and the efficiency of the whole arrangement.

This object is achieved in principle according to the present invention by the use of a single induction regulator with one stator winding and one rotor winding, the winding phases of which are connected to the commutator brushes of the A. C. stator fed commutator motor to be controlled, and to a low voltage supply, which is obtained by transformer action, from the same supply as that which feeds the stator winding of the stator fed commutator motor. The commutator brushes or some of them can also be connected, according to the invention, to tappings in the low voltage winding feeding the induction regulator.

The principle of the invention and its application to the speed control of an A. C. shunt commutator motor are illustrated diagrammatically by the accompanying drawings.

Figure 1:
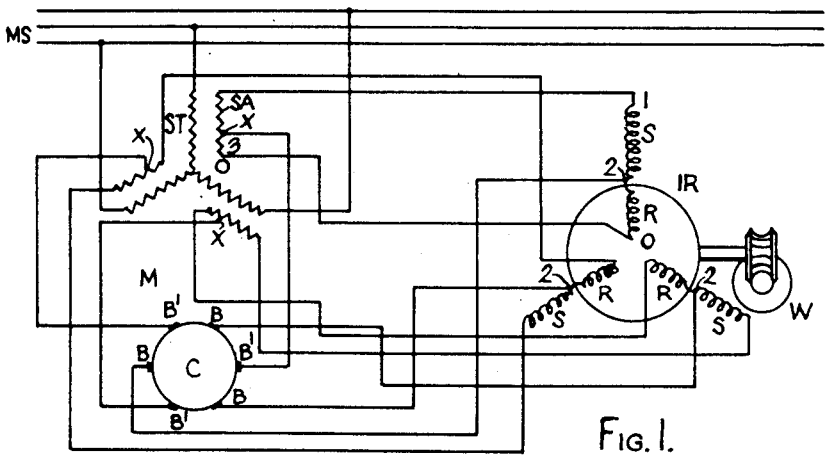
Figure 1 shows an example of the invention comprising the stator fed commutator motor and the single induction regulator, the latter being fed from an auxiliary winding in the motor stator, the rotor being connected in three open phases, resulting in six phase feeding of the commutator of the motor.

In Figure 1, IR is a single induction regulator operable by any suitable means, represented schematically as a worm and worm wheel W, and M is a stator fed A. C. commutator motor to be controlled. The induction regulator IR has a 3-phase stator winding S, and a 3-phase rotor winding R. Both windings are wound with three open phases.

The three winding phases of the stator winding S are connected to one end of the three winding phases of the rotor winding R of the induction regulator. The free ends of the so connected windings S and R are connected to the free ends of the winding phases of an auxiliary winding SA in the stator of the motor M which has a stator winding ST connected to the supply MS. The auxiliary winding SA is accommodated in the same slots as the motor stator winding ST.

The windings SA and ST are, therefore, linked with each other by transformer action.

The rotor of the commutator motor M is connected by way of the commutator C and three of the commutator brushes B to the connection points between the connected windings S and R of the single induction regulator IR on the one hand, and on the other hand through the remaining brushes B' to tappings X made in the auxiliary stator winding SA. This represents a 6-phase feeding of the commutator C.

Figure 1A:
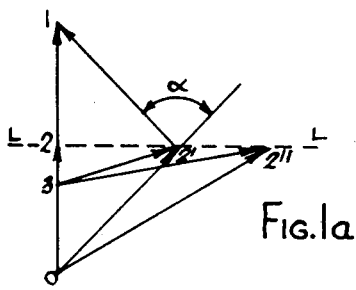
Figure 1a is a voltage vector diagram illustrating the function of the arrangement shown in Figure 1.

In considering now the voltage obtained at any one pair of commutator brushes electrically displaced through 180° on the commutator C and fed from one phase of the winding system S, R and SA, reference is made to the voltage vector diagram in Figure 1a.

In Figure 1a, 0, 1 represents the voltage between the points 0 and 1 (Figure 1) of one phase of the stator auxiliary winding SA in Figure 1.

With the rotor of the induction regulator IR set in such a position that each winding phase of its rotor winding R is co-axial with the winding phase of its stator winding S, to which such winding phase of R is connected, the voltage in the two connected rotor and stator winding phases selected for consideration are vectorially of the same direction, and therefore algebraically additive.

Assuming, moreover, that the number of turns per phase in the stator and rotor windings S and R of the induction regulator IR are equal, the voltage 0, 2 in the rotor winding R is equal to the voltage 2, 1 in the stator winding S and each is half the amount of the voltage 0, 1 in the winding SA which in its turn is determined by the transformation ratio between the motor stator winding ST and the auxiliary winding SA.

This transformation ratio is so chosen that the voltage of the auxiliary winding SA is suitable for obtaining the required voltage for introduction into the rotor circuit of the motor.

In this connection it must be realised that it is, in practice, impossible to design an A. C. commutator motor for a rotor voltage which is equal to the usual supply voltages. The reason for this is the limitations imposed by considerations of commutation.

In the arrangement according to the invention, the necessary transformation of the rotor voltage is incorporated.

By turning the rotor of the induction regulator IR relatively to its stator through an angle $\alpha$ from the above mentioned "neutral" position, the vectors 0, 2' and 2', 1 of the rotor and stator voltage respectively, will have the position shown in the diagram Figure 1a.

By increasing the displacement angle $\alpha$, the point 2'' becomes the vector end of the rotor voltage vector. The vector ends 2, 2', 2'', and so forth have as a locus the dotted straight line L, shown in Figure 1a.

The tapping X of the stator auxiliary winding SA (Figure 1) is generally so chosen that it does not coincide with the centre of this winding, the voltage between 1 and X being represented by the vector 3, 1, in Figure 1a.

The voltage between the tapping X of the auxiliary winding SA and the connection point 2 of the induction regulator windings S and R in Figure 1 is represented in Figure 1a by the vector 3, 2 for the co-axial "neutral" rotor position where $\alpha=0$.

With a displacement angle $\alpha$ this vector changes into 3, 2', the origin of all the vectors of the voltage between X and the connection point 2 being the point 3, and the locus of the vector ends being the dotted straight line L.

It will be seen, therefore, from Figure 1a that the described arrangement results in the application to the commutator brushes, of the motor, of a variable voltage of constant phase position, which in the neutral position of the regulator IR has the value 0, and at a displacement angle $\alpha$, the value 2, 2', and increases to 2, 2'' when the displacement angle is still further increased.

The voltage component 3, 2 remains constant irrespective of the displacement angle and is contained in each voltage vector, as can be clearly seen in the vector diagram Figure 1a.

The variable voltage component, for instance 2, 2' or 2, 2'', is used for obtaining speed variation of the motor M, and the constant voltage component 3, 2 displaced through 90°, is used for obtaining a leading magnetising current in the commutator circuit for power factor correction.

Disregarding influences of the second order, the variable voltage component (for instance 2, 2' in Figure 1a, for an adjustment of the induction regulator according to the angle $\alpha$) determines the speed of the motor M with reference to its synchronous speed and, as this component can be applied so that it becomes additive or subtractive, by turning the induction regulator in one direction or the other from the neutral position ($\alpha=0$), speeds above and below synchronism are obtainable.

It will be appreciated that the magnitude of the rotor voltage is, theoretically, unlimited and, practically, only limited by the flux that can be carried by the induction regulator. Another advantage of the present arrangement is that the iron losses and copper losses, the magnetising current and the reactive voltage drop are smaller when less than the maximum voltage is required.

The overall efficiency of the arrangement, which replaces a double induction regulator, (plus an additional compensating winding) is on the average very much improved, for at least two reasons. Firstly, the whole output required is provided by one unit instead of two, which results in a comparatively higher efficiency and less magnetising kv.-a. Secondly, as previously explained, the maximum losses of this single induction regulator occur only at the maximum voltage output and, therefore, the average losses taken over the whole voltage range, are comparatively small.

Figure 2:
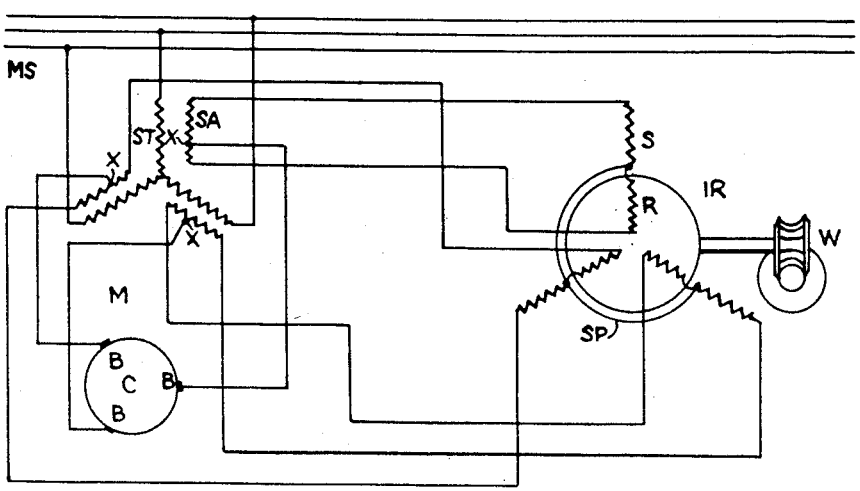
Figure 2 illustrates the same arrangement as in Figure 1, but with three phase feeding of the commutator of the motor.

In Figure 2 the same reference indications as in Figure 1 are used for the corresponding parts.

The arrangement represented by Figure 2 differs from that shown in Figure 1 in that the commutator C in Figure 2 has a 3-phase feed as compared with the 6-phase feed in Figure 1.

In order to obtain this 3-phase feed the commutator brushes B shown in Figure 1 connected to the connection point between the two windings S and R of the regulator are omitted in Figure 2, and only the remaining three brushes B' connected to the tappings X of the winding SA in the motor stator ST are retained.

The connection points between the windings S and R of the regulator IR, in Figure 2, are connected together to form a star point SP, common to both windings, for the rotor circuit.

Instead of starring the connection points as shown in Figure 2 it is equally possible to introduce a star point by connecting the tappings X in Figure 1 and omitting the commutator brushes connected to these points.

The arrangement shown in Figure 2 is, however, preferable as three connecting leads between the regulator and the motor are saved.

In so far as electrical function and the vector diagram are concerned there is no difference as compared with the arrangement of Figure 1 in either of the two possible three phase feeding arrangements described.

One general advantage of any of the arrangements according to the invention is that, as the theoretical voltage range of the variable output voltage is unlimited, higher voltages outside the predetermined range for continuous rating can be occasionally used for short time rating, by overfluxing the induction regulator temporarily.

One example where such procedure can be adopted usefully, is in the case of a variable speed commutator motor of a certain fixed speed range but which, however, is required to operate for a short period, for instance, for threading or feeding purposes, outside such speed range.

Another example is the utilisation of this extended voltage range for starting or dynamic braking purposes only.

This results in a smooth start from standstill or braking to standstill with temporary overloading of the induction regulator, such overloading being immaterial in view of its short duration.

The invention thus enables an induction regulator of smaller size than usual to be employed, in view of the extended voltage range obtainable, thus resulting in lower losses, lower magnetising currents and lower costs than usual.

In order to reverse the direction of rotation of a stator fed commutator motor in general, as in any of the described arangements, besides changing over of two supply lines, steps have to be taken to ensure the correct introduction of the compensating voltage for the new direction of rotation.

This is necessary in view of the fact that the leading voltage component suitable for the compensation in one direction of rotation becomes lagging and, therefore, counter-compensating in the other direction of rotation, if no changes in the internal conditions are carried out.

The direct way of achieving this result would be to change the beginning and the end of each individual winding phase either in the primary or secondary of the induction regulator, including transformer, where provided, or individual parts of the stator auxiliary winding.

In order to avoid the increased number of contacts, terminals, especially those for heavy currents, and of flexibles for the rotor circuit of the induction regulator, thereby entailed, the following simple way can be adopted in accordance with the invention to ensure correct compensation which, moreover, does not require any different speed adjustment of the regulator in the different directions of rotation of the motor.

For this purpose and in accordance with the invention the numerical proportion between the two voltage components producing a resultant secondary voltage, which is fed to the secondary circuit of the motor, is so altered that the magnetising component becomes negative in the reversed direction of rotation of the motor.

Figure 3:
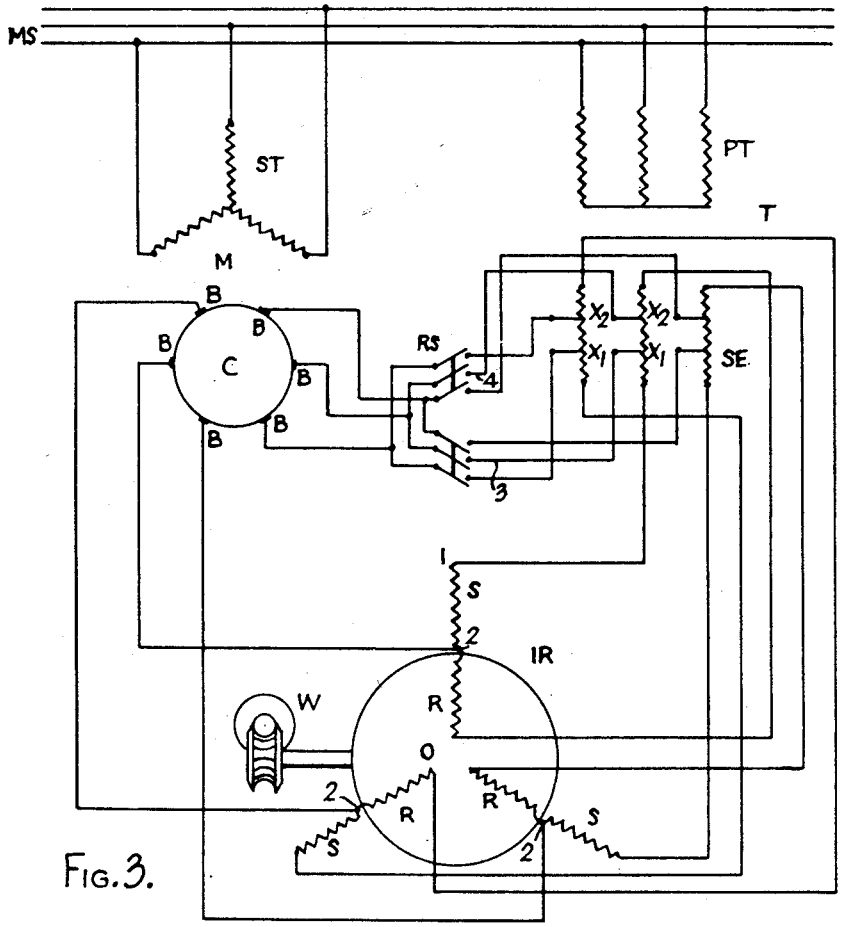
Figure 3 illustrates a further embodiment of the invention in which the induction regulator is used in conjunction with an auxiliary transformer for the speed control of a reversible A. C. commutator motor.

In Figure 3 which is fundamentally equivalent to Figure 1, the secondary winding SE of a transformer T feeds the single induction regulator IR, the primary PT of the transformer being connected to the supply MS.

Tappings X1 and X2 are made in the winding SE for alternative connection to the brushes B of the commutator C of the motor M, by a reversing switch RS.

Figure 3A:
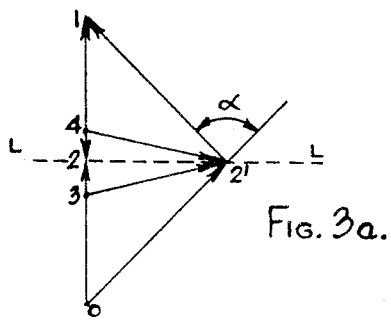
Figure 3a is the voltage vector diagram illustrating the function of the arrangement shown in Figure 3.

Referring now to the vector diagram illustrated by Figure 3a, the vectors 0, 2' and 2', 1 represent the two voltage components produced by the stator winding S and the rotor winding R of the induction regulator IR, at a relative adjustment between the stator and rotor units thereof through an angle α, while 0, 2 and 2,1 indicate the vectors of these voltages where α=0, the locus of the vector ends 2, 2' and so forth being again indicated by the dotted straight line L.

By connecting the commutator brushes B between the tapping X1 and the point of connection 2 between the primary and secondary windings R and S of the induction regulator IR, the resultant voltage fed to the commutator C is, therefore, again the voltage represented by the vector 3, 2', the point 3 constituting, as in Figure 1a, the point of origin of all the vectors, and the dotted line L still remaining the locus of the vector ends 2, 2' and so forth.

The constant compensation voltage, which is introduced into the circuit as a magnetising component, is represented by 3, 2, and the speed regulating voltage component by 2, 2'.

When, for the purpose of reversing the direction of rotation of the motor M, the reversing switch RS, Figure 3, is moved into contact with the tappings X2, the commutator brushes are connected between the tappings X2 and the points of connection 2 between the stator and rotor windings S and R of the induction regulator IR.

Under these conditions, the resultant voltage fed to the commutator C is the voltage represented by the vector 4, 2' in Figure 3a, whilst 4, 2 represents the magnetising component which, it will be observed, is in the reverse direction to that of 3, 2, the point 4 now constituting the new point of origin of all the vectors, and the dotted line L still remaining the locus of the vector ends 2, 2'.

As a change occurs in the leading and lagging sense when a change in the direction of rotation of the rotating field is made, 4, 2 will be a leading component, as is required, in reference to the voltage component 2, 2' in the reverse direction of rotation of the motor, assuming 3, 2 to have been a leading component in reference to the voltage component 2, 2' in the forward direction of rotation of the motor.

This effect is obtained without altering the relation between the voltage regulating component 2, 2' and its speed regulating effect. In other words, if the adjustment represented by Figure 3a gives a hyper-synchronous speed in one direction of rotation of the motor, when the reversing switch RS is in circuit with the tappings X1, the speed remains hyper-synchronous in the reverse direction of rotation of the motor when the reversing switch RS is in circuit with the tapping X2.

I claim:

1. A control system for a stator fed multiphase commutator motor comprising a multiphase single core induction regulator having stator and rotor units each provided with winding slots therein, a winding arranged in the slots of one of said units and another winding arranged in the slots of the other of said units, the winding phases of one of said windings being connected at one end to the winding phases of the other of said windings, and a third winding inductively coupled to the supply and located in a magnetic circuit independent of the magnetic circuit of said induction regulator, the winding phases of said third winding each having a tapping and being connected at their free ends to the free ends of the winding phases of said connected windings of said induction regulator, the said tappings in said third winding being connected to commutator brushes of the commutator motor to be controlled.

2. A control system for a stator fed multiphase commutator motor comprising a multiphase single core induction regulator having stator and rotor units each provided with winding slots therein, a winding arranged in the slots of one of said units and another winding arranged in the slots of the other of said units, the winding phases of one of said windings being connected at one end to the winding phases of the other of said windings, and a third winding inductively coupled to the supply and located in a magnetic circuit independent of the magnetic circuit of said induction regulator, the winding phases of said third winding each having a tapping and being connected at their free ends to the free ends of the winding phases of said connected windings of said induction regulator, the said tappings in said third winding and the points of connection between said connected windings of said induction regulator being connected to commutator brushes of the commutator motor to be controlled.

3. A control system for a stator fed multiphase commutator motor comprising a multiphase single core induction regulator having stator and rotor units each provided with winding slots therein, a winding arranged in the slots of one of said units and another winding arranged in the slots of the other of said units, the winding phases of one of said windings being connected at one end to the winding phases of the other of said windings, and a third winding inductively coupled to the supply and located in a magnetic circuit independent of the magnetic circuit of said induction regulator, the winding phases of said third winding each having a tapping and being connected at their free ends to the free ends of the winding phases of said connected windings of said induction regulator, the said tappings in said third winding being connected to commutator brushes of the commutator motor to be controlled, and the points of connection between said connected windings of said induction regulator being connected together to form a star point for both of said connected windings.

4. A control system for a stator fed multiphase commutator motor comprising a multiphase single core induction regulator having stator and rotor units each provided with winding slots therein, a winding arranged in the slots of one of said units and another winding arranged in the slots of the other of said units, the winding phases of one of said windings being connected at one end to the winding phases of the other of said windings, and a third winding located in the stator of said commutator motor, and thereby inductively coupled to the supply, the winding phases of said third winding each having a tapping and being connected at their free ends to the free ends of the winding phases of said connected windings of said induction regulator, said tappings of said third winding being connected to commutator brushes of the commutator motor.

5. A control system for a stator fed multiphase commutator motor comprising a multiphase single core induction regulator having stator and rotor units each provided with winding slots therein, a winding arranged in the slots of one of said units and another winding arranged in the slots of the other of said units, the winding phases of one of said windings being connected at one end to the winding phases of the other of said windings, and a transformer having a primary winding connected to the supply and a secondary winding fed by transformer action from the said primary winding the winding phases of said secondary winding each having a tapping and being connected at their free ends to the free ends of the winding phases of said connected windings of said induction regulator, the said tappings being connected to commutator brushes of the commutator motor to be controlled.

6. A control system for a stator fed multiphase commutator motor comprising a multiphase single core induction regulator having stator and rotor units each provided with winding slots therein, a winding arranged in the slots of one of said units and another winding arranged in the slots of the other of said units, the winding phases of one of said windings being connected at one end to the winding phases of the other of said windings, and a third winding inductively coupled to the supply and located in a magnetic circuit independent of the magnetic circuit of said induction regulator, the winding phases of said third winding each having two tappings and being connected at their free ends to the free ends of said connected windings of said induction regulator the said two tappings of each winding phase of said third winding being alternatively connected to the commutator brushes of the commutator motor to be controlled, for different directions of rotation of said commutator motor.

BENNO SCHWARZ.

REFERENCES CITED

The following references are of record in the file of this patent:

UNITED STATES PATENTS

| Number | Name | Date |
|---|---|---|
| 1,658,662 | Welsch | Feb. 7, 1928 |
| 2,380,265 | Robinson | July 10, 1945 |

FOREIGN PATENTS

| Number | Country | Date |
|---|---|---|
| 549,536 | Great Britain | Feb. 18, 1943 |